(12) United States Patent
Eguchi

(10) Patent No.: US 6,829,106 B2
(45) Date of Patent: Dec. 7, 2004

(54) HIGH ZOOM-RATIO ZOOM LENS SYSTEM

(75) Inventor: Masaru Eguchi, Saitama (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 10/641,052

(22) Filed: Aug. 15, 2003

(65) Prior Publication Data
US 2004/0051959 A1 Mar. 18, 2004

(30) Foreign Application Priority Data
Aug. 20, 2002 (JP) .......................... 2002-238868

(51) Int. Cl.⁷ .................. G02B 9/34; G02B 15/14
(52) U.S. Cl. .................. 359/773; 359/772; 359/686; 359/771
(58) Field of Search .................. 359/773, 772, 359/776, 777, 778, 766, 763, 686, 687, 676

(56) References Cited

U.S. PATENT DOCUMENTS

| | | | |
|---|---|---|---|
| 4,978,204 A | 12/1990 | Ito | |
| 5,455,714 A | 10/1995 | Kohno | 359/689 |
| 5,572,277 A * | 11/1996 | Uzawa et al. | 359/686 |
| 6,002,529 A | 12/1999 | Kohno et al. | |
| 6,369,955 B1 | 4/2002 | Enomoto et al. | 359/685 |
| 6,449,433 B2 * | 9/2002 | Hagimori et al. | 396/72 |

FOREIGN PATENT DOCUMENTS

| | | |
|---|---|---|
| JP | 2-256015 | 10/1990 |
| JP | 6-265788 | 9/1994 |
| JP | 2000-180725 | 6/2000 |

* cited by examiner

Primary Examiner—Timothy Thompson
(74) Attorney, Agent, or Firm—Greenblum & Bernstein, P.L.C.

(57) ABSTRACT

A high zoom-ratio zoom lens system includes a positive first lens group, a negative second lens group, a positive third lens group, and a negative fourth lens group. Zooming is performed by moving each of the lens groups along the optical axis.

5 Claims, 14 Drawing Sheets

F_{NO}.=1:5.6

-1   1
SPHERICAL
ABERRATION
CHROMATIC
ABERRATION

W=36.0°

——— d Line
······· g Line
- - - C Line

-0.05  0.05
LATERAL
CHROMATIC
ABERRATION

W=36.0°

——— S
- - M

-1   1
ASTIGMATISM

W=36.0°

-5 (%) 5
DISTORTION

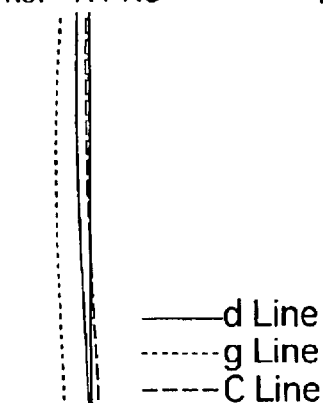
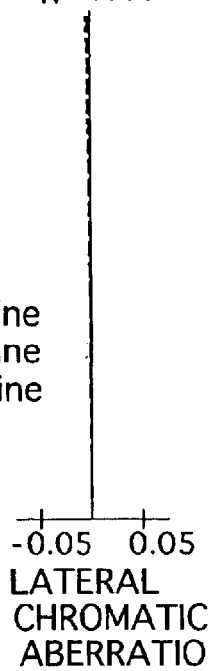
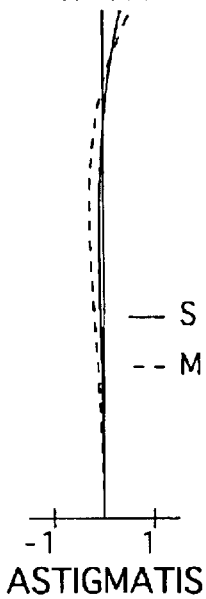
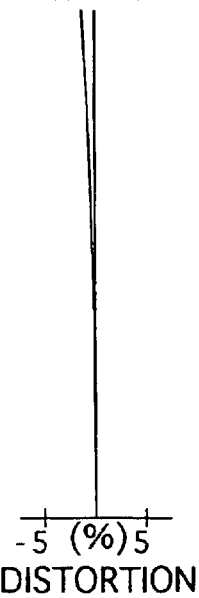
Fig. 3A  
FNO.=1:11.3  
— d Line  
······ g Line  
---- C Line  
-1  1  
SPHERICAL ABERRATION  
CHROMATIC ABERRATION
Fig. 3B  
W=17.4°  
-0.05  0.05  
LATERAL CHROMATIC ABERRATION
Fig. 3C  
W=17.4°  
— S  
-- M  
-1  1  
ASTIGMATISM
Fig. 3D  
W=17.4°  
-5 (%) 5  
DISTORTION
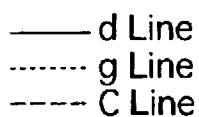
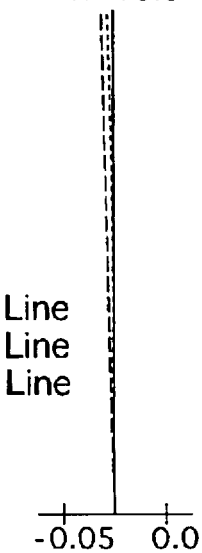
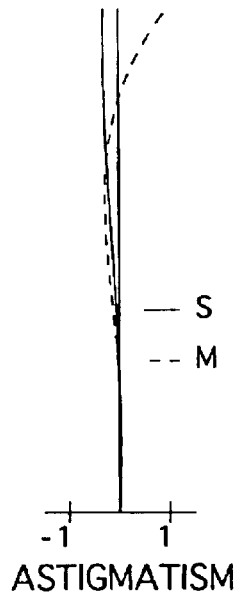
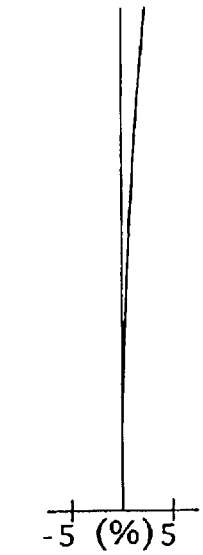
Fig. 4A  
FNO.=1:9.4  
— d Line  
······ g Line  
---- C Line  
-1  1  
SPHERICAL ABERRATION  
CHROMATIC ABERRATION
Fig. 4B  
W=10.5°  
-0.05  0.05  
LATERAL CHROMATIC ABERRATION
Fig. 4C  
W=10.5°  
— S  
-- M  
-1  1  
ASTIGMATISM
Fig. 4D  
W=10.5°  
-5 (%) 5  
DISTORTION

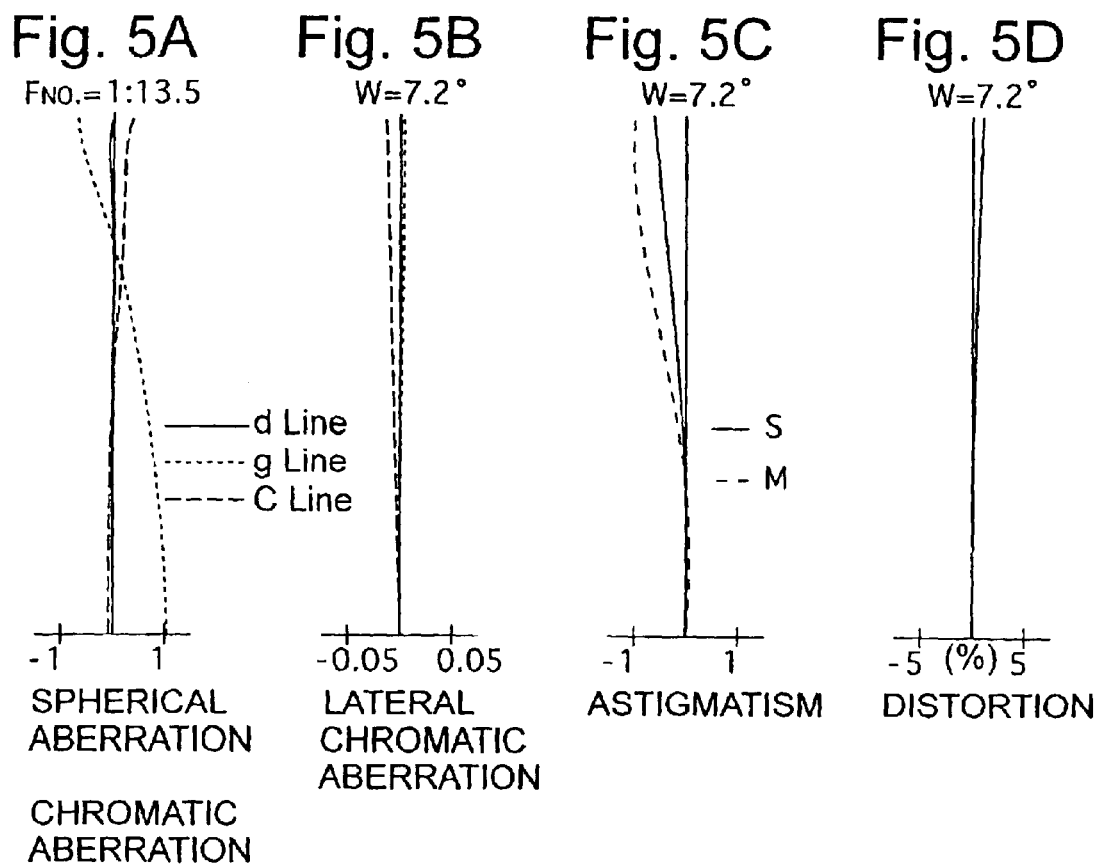
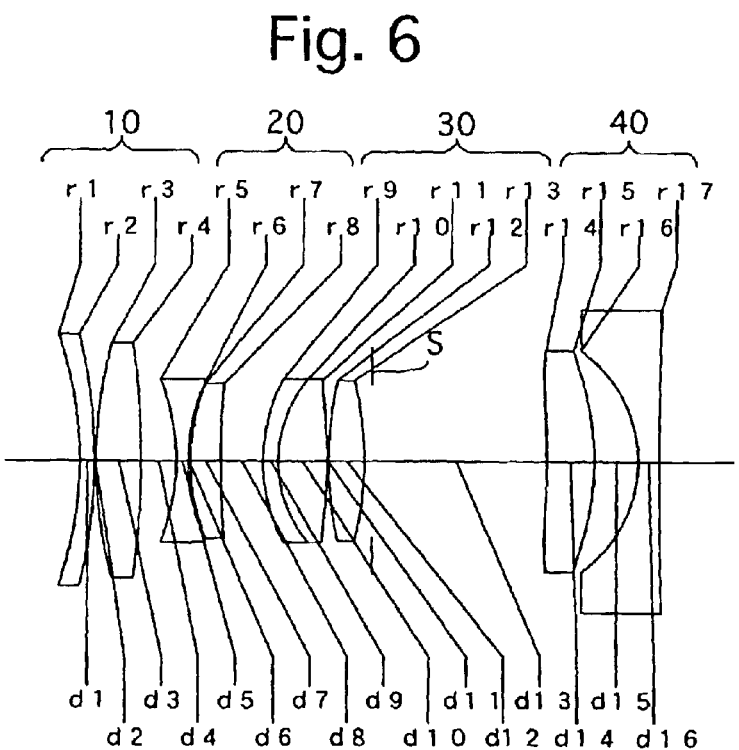

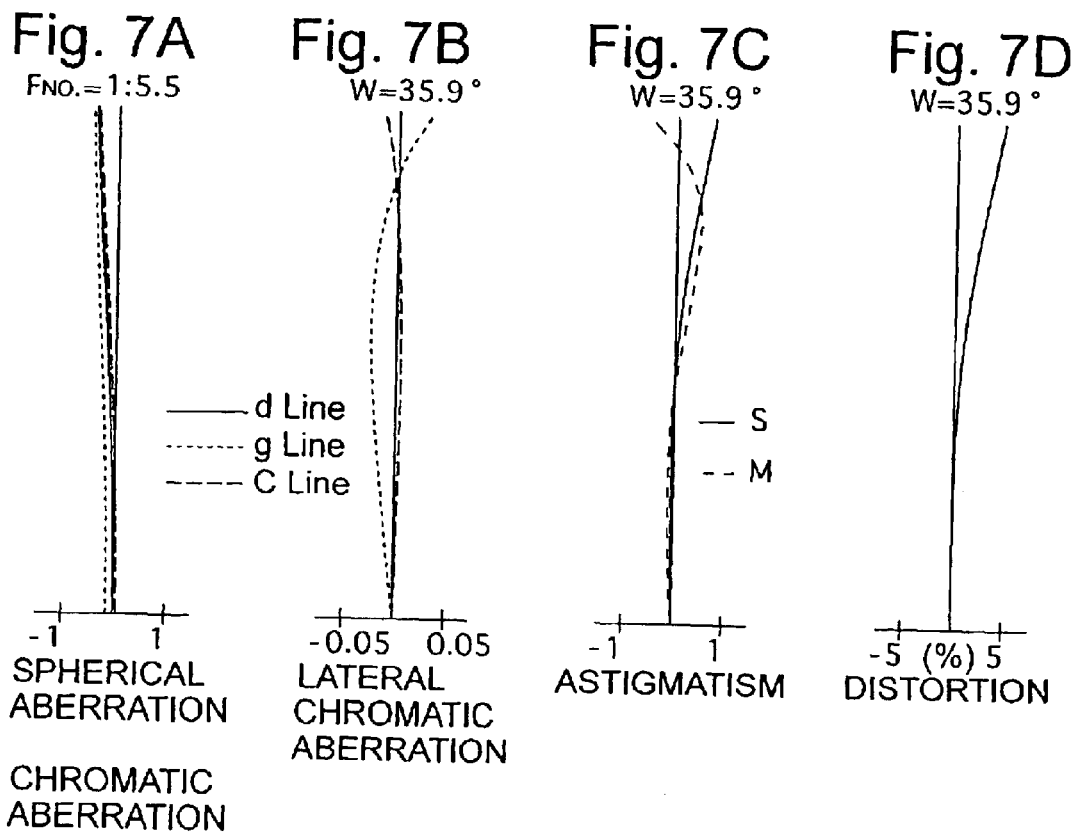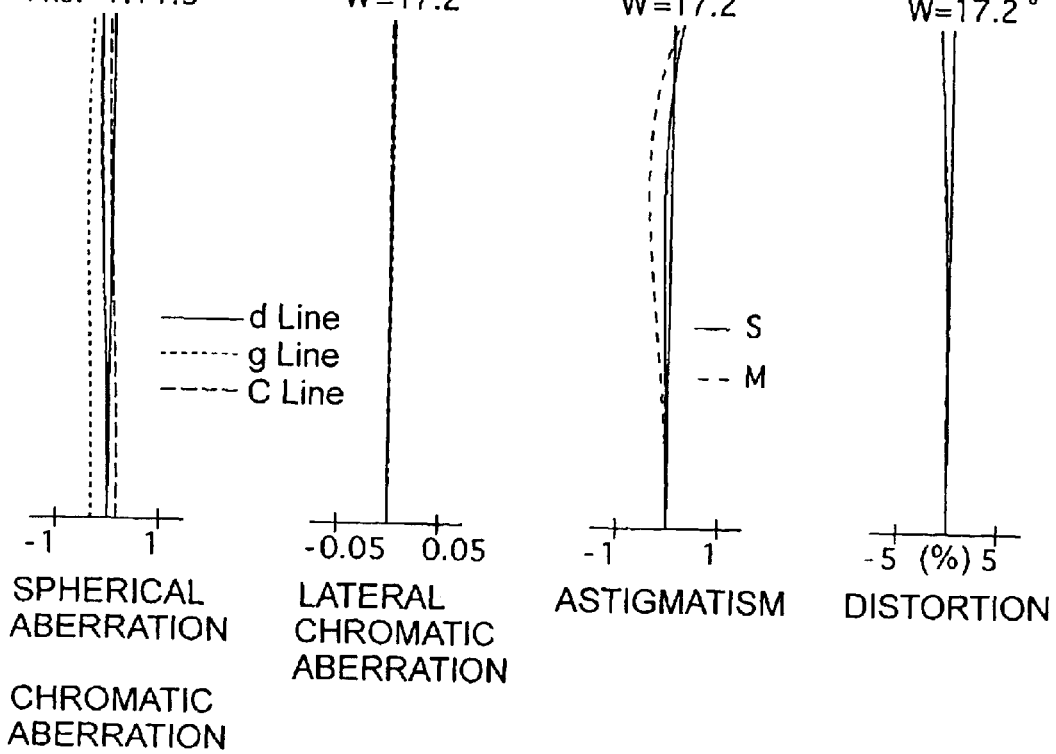

Fig. 9A
$F_{NO.}=1:9.2$
Fig. 9B
$W=11.0°$
Fig. 9C
$W=11.0°$
Fig. 9D
$W=11.0°$
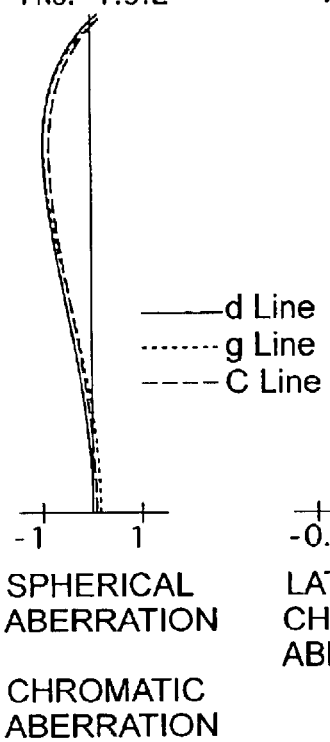
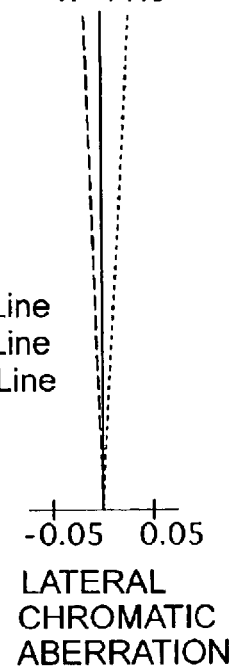
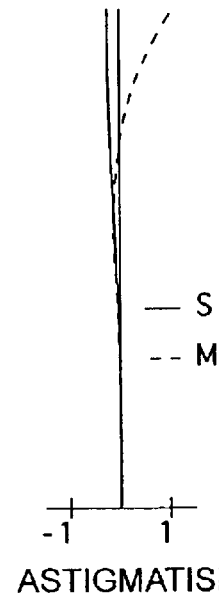
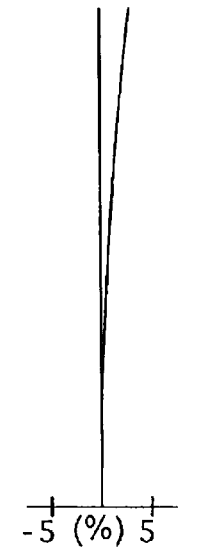
—— d Line
······ g Line
— — C Line
— S
-- M
-1   1
SPHERICAL
ABERRATION
CHROMATIC
ABERRATION
-0.05   0.05
LATERAL
CHROMATIC
ABERRATION
-1   1
ASTIGMATISM
-5 (%) 5
DISTORTION
Fig. 10A
$F_{NO.}=1:12.7$
Fig. 10B
$W=7.2°$
Fig. 10C
$W=7.2°$
Fig. 10D
$W=7.2°$
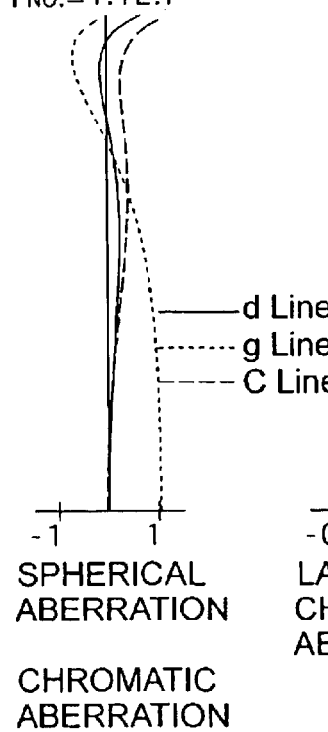
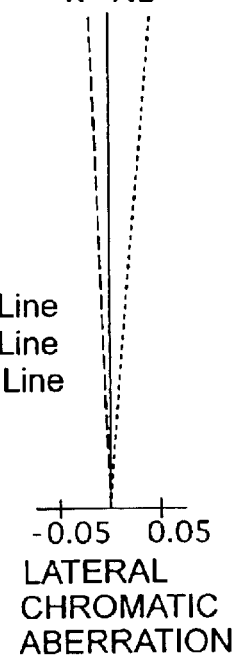
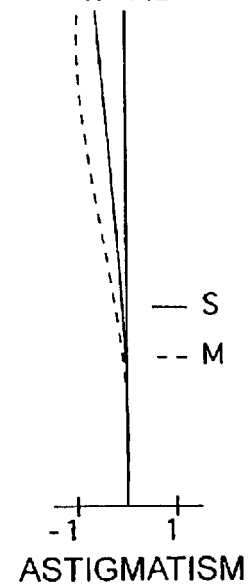
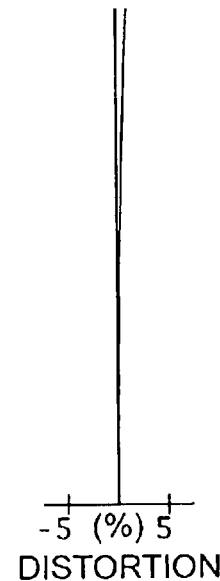
—— d Line
······ g Line
— — C Line
— S
-- M
-1   1
SPHERICAL
ABERRATION
CHROMATIC
ABERRATION
-0.05   0.05
LATERAL
CHROMATIC
ABERRATION
-1   1
ASTIGMATISM
-5 (%) 5
DISTORTION

FNO.=1:11.6

———— d Line
········ g Line
———— C Line

-1  1
SPHERICAL
ABERRATION

CHROMATIC
ABERRATION

W=17.1°

-0.05  0.05
LATERAL
CHROMATIC
ABERRATION

W=17.1°

——— S
--- M

-1  1
ASTIGMATISM

W=17.1°

-5 (%) 5
DISTORTION

FNO.=1:9.6

———— d Line
········ g Line
———— C Line

-1  1
SPHERICAL
ABERRATION

CHROMATIC
ABERRATION

W=10.8°

-0.05  0.05
LATERAL
CHROMATIC
ABERRATION

W=10.8°

——— S
--- M

-1  1
ASTIGMATISM

W=10.8°

-5 (%) 5
DISTORTION $F_{NO.}=1:13.5$

—— d Line
······ g Line
---- C Line

-1  1
SPHERICAL ABERRATION
CHROMATIC ABERRATION

W=7.2°

-0.05  0.05
LATERAL CHROMATIC ABERRATION

W=7.2°

—— S
-- M

-1  1
ASTIGMATISM

W=7.2°

-5 (%) 5
DISTORTION

FNO.= 1:5.5

—— d Line
······· g Line
---- C Line

-1  1
SPHERICAL
ABERRATION
CHROMATIC
ABERRATION

W=35.9°

-0.05  0.05
LATERAL
CHROMATIC
ABERRATION

W=35.9°

—— S
-- M

-1  1
ASTIGMATISM

W=35.9°

-5 (%) 5
DISTORTION

FNO.= 1:11.3

—— d Line
······· g Line
---- C Line

-1  1
SPHERICAL
ABERRATION
CHROMATIC
ABERRATION

W=17.1°

-0.05  0.05
LATERAL
CHROMATIC
ABERRATION

W=17.1°

—— S
-- M

-1  1
ASTIGMATISM

W=17.1°

-5 (%) 5
DISTORTION

Fig. 19A F_NO.=1:9.4
SPHERICAL ABERRATION
CHROMATIC ABERRATION

Fig. 19B W=10.5°
LATERAL CHROMATIC ABERRATION
— d Line
····· g Line
---- C Line

Fig. 19C W=10.5°
ASTIGMATISM
— S
-- M

Fig. 19D W=10.5°
DISTORTION

Fig. 20A F_NO.=1:13.2
SPHERICAL ABERRATION
CHROMATIC ABERRATION
— d Line
····· g Line
---- C Line

Fig. 20B W=7.2°
LATERAL CHROMATIC ABERRATION

Fig. 20C W=7.2°
ASTIGMATISM
— S
-- M

Fig. 20D W=7.2°
DISTORTION

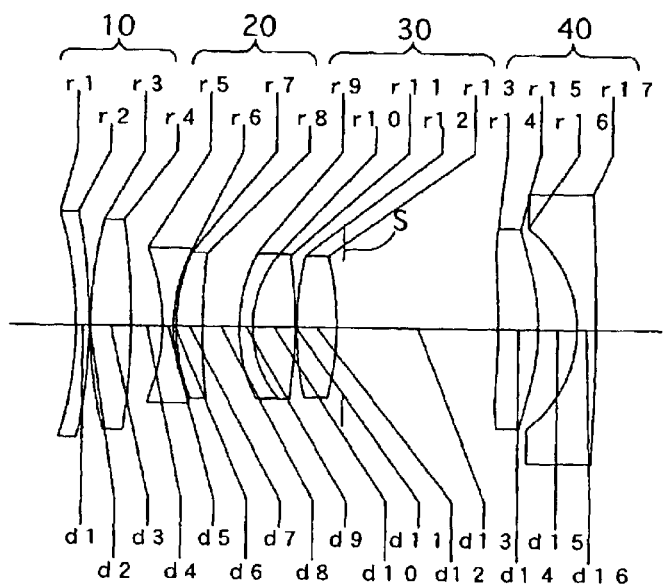
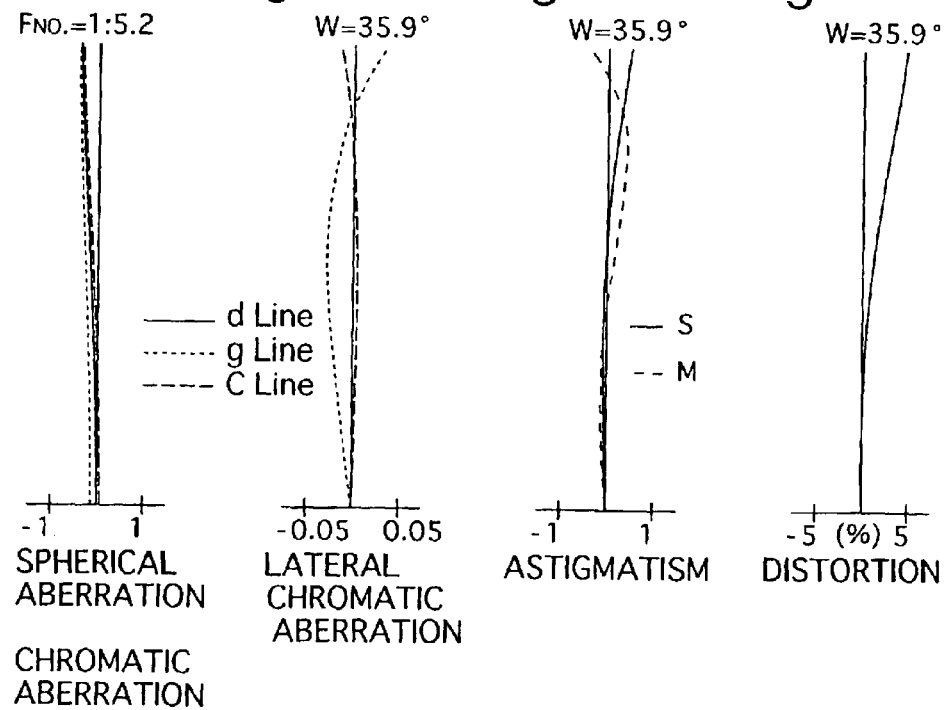

FNO.=1:12.0

-1  1
SPHERICAL
ABERRATION

CHROMATIC
ABERRATION

—— d Line
------ g Line
---- C Line

W=16.3°

-0.05  0.05
LATERAL
CHROMATIC
ABERRATION

W=16.3°

— S
-- M

-1  1
ASTIGMATISM

W=16.3°

-5 (%) 5
DISTORTION

FNO.=1:10.8

—— d Line
------ g Line
---- C Line

-1  1
SPHERICAL
ABERRATION

CHROMATIC
ABERRATION

W=9.3°

-0.05  0.05
LATERAL
CHROMATIC
ABERRATION

W=9.3°

— S
-- M

-1  1
ASTIGMATISM

W=9.3°

-5 (%) 5
DISTORTION

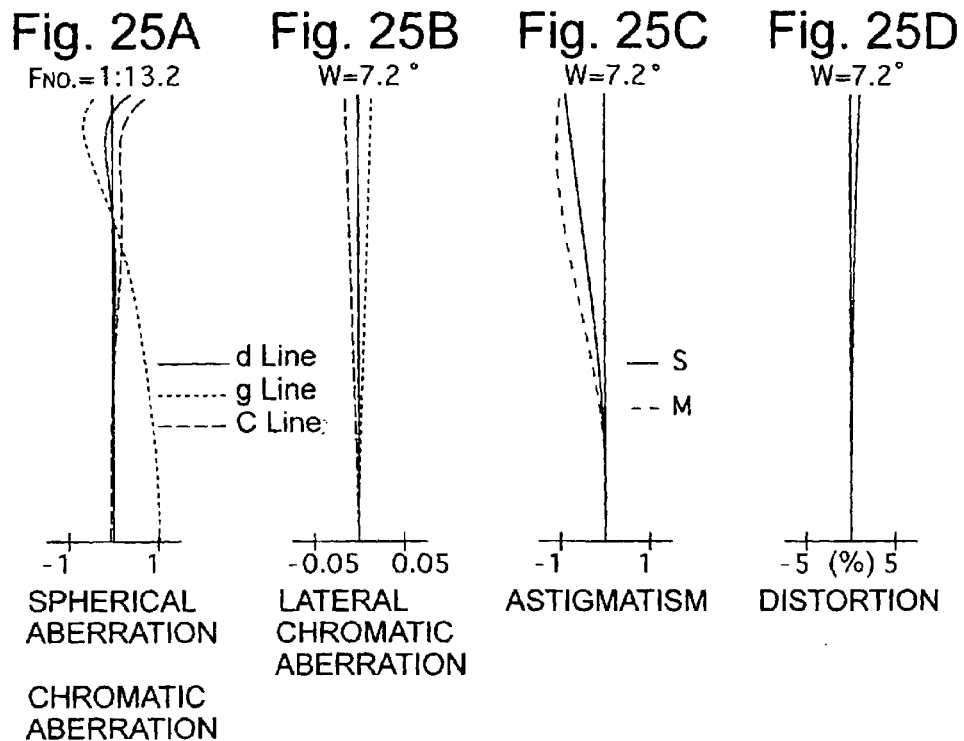
Fig. 25A FNO.=1:13.2 SPHERICAL ABERRATION CHROMATIC ABERRATION
— d Line
······ g Line
--- C Line
Fig. 25B W=7.2° LATERAL CHROMATIC ABERRATION
Fig. 25C W=7.2° ASTIGMATISM
— S
-- M
Fig. 25D W=7.2° DISTORTION
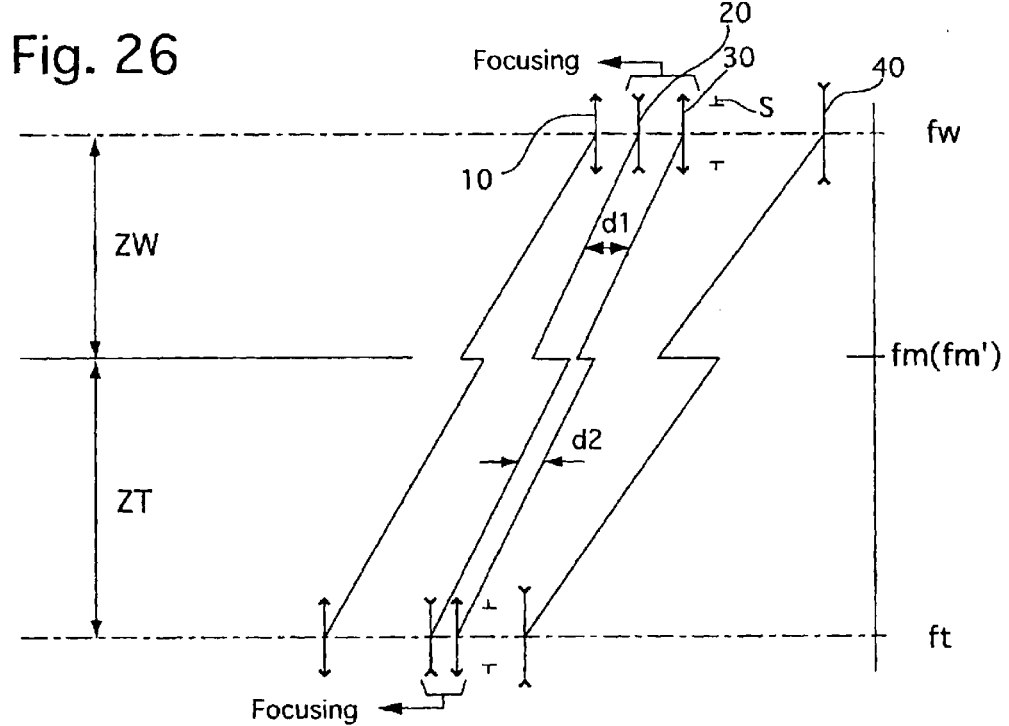
Fig. 26

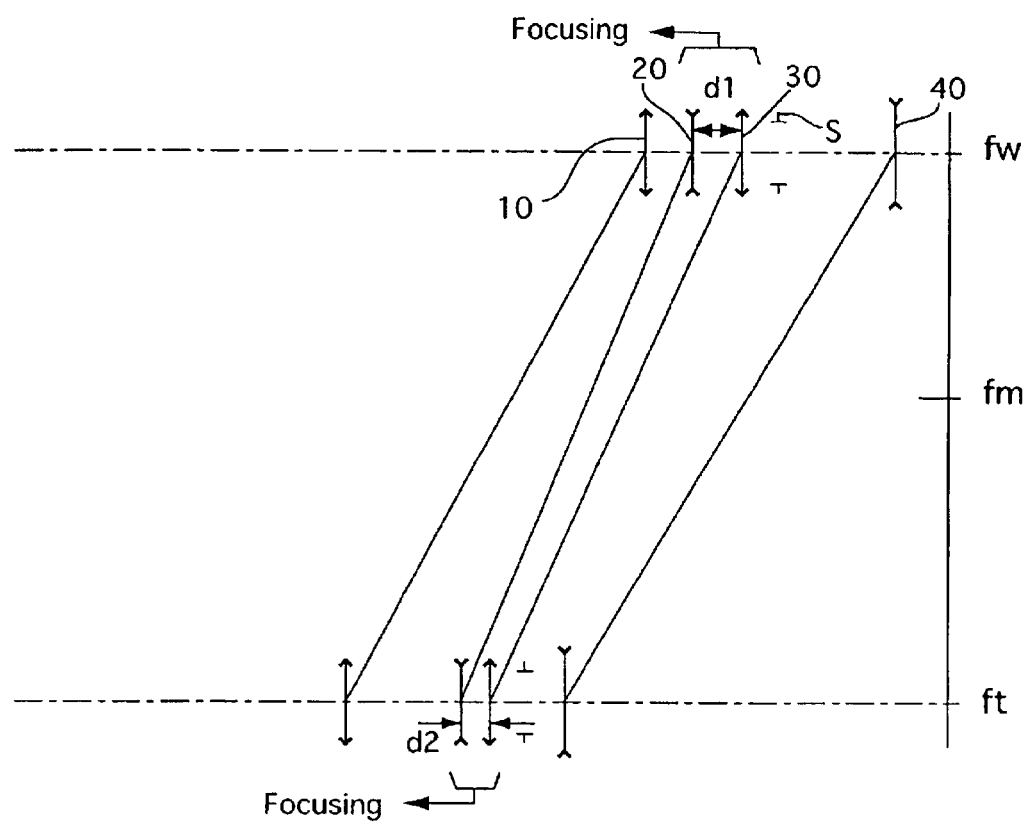

HIGH ZOOM-RATIO ZOOM LENS SYSTEM

BACKGROUND OF THE INVENTION

1. Field of the Invention

The present invention relates to a high zoom-ratio zoom lens system for a photographic camera, especially for a lens shutter camera.

2. Description of the Prior Art

Unlike a zoom lens system of a single lens reflex (SLR) camera which requires a space to accommodate a quick-return mirror behind the photographing lens system, a zoom lens system of a compact camera does not require a long back focal distance. As an example of such a high magnification-ratio zoom lens system of a lens shutter camera in which there is no substantial constrain on the back focal distance, a zoom lens system, including a lens group having a positive refractive power (hereinafter, a positive lens group), another positive lens group, and a lens group having a negative refractive power (hereinafter, a negative lens group), in this order from the object, has been proposed (e.g., U.S. Pat. No. 4,978,204). However, in such a zoom lens system, if an attempt is made to further increase the zoom ratio, the overall length of the zoom lens system inevitably becomes longer at the long focal length extremity.

Furthermore, for the purpose of achieving further miniaturization and a higher zoom ratio, a zoom lens system including a positive lens group, a negative lens group, a positive lens group and a negative lens group, in this order from the object, has been proposed (e.g., U.S. Pat. No. 6,002,529 and Japanese Unexamined Patent Publication No. 2000-180725). However, in such a lens arrangement, the traveling distances of the lens groups are longer, so that the overall length of the zoom lens system at the long focal length extremity becomes longer. Moreover, the frontmost lens diameter becomes larger since the entrance pupil position is distant at the short focal length extremity. Consequently, further miniaturization of the camera cannot be achieved.

SUMMARY OF THE INVENTION

The present invention provides a miniaturized and high-zoom-ratio zoom lens system in which (i) the overall length thereof can be made shorter at the long focal length extremity, (ii) the diameter of the frontmost lens group can be reduced, and (iii) appropriate optical performance is attained over the entire focal length regard less of a smaller number of lens elements.

More specifically, in the zoom lens system of the present invention, the zoom ratio $Z$ ($=f_T/f_W$) is more than 5 ($Z>5$); the overall length thereof $TL_T$ at the long focal length extremity is short to the extent that $TL_T/f_T$ is less than 0.8 ($TL_T/f_T<0.8$); and the diameter of the frontmost lens group is small.

Accordingly, the present invention provides a high-zoom-ratio zoom lens system suitable for a lens shutter camera having in a retractable photographing lens system.

According to an aspect of the present invention, there is provided a high zoom-ratio zoom lens system including a first lens group having a positive refractive power (hereinafter, a positive first lens group), a second lens group having a negative refractive power (hereinafter, a negative second lens group), a third lens group having a positive refractive power (hereinafter, a positive third lens group), and a fourth lens group having a negative refractive power (hereinafter, a negative fourth lens group), in this order from the object.

Zooming is performed by moving each of the positive first through positive fourth lens groups along the optical axis.

The high zoom-ratio zoom lens system satisfies the following conditions:

$$0.2 < LD_{23W}/f_W < 0.70 \quad (1)$$

$$0.02 < \Delta D_{23}/f_W < 0.2 \quad (2)$$

$$11 < |f_T/f_2| < 14 \ (f_2 < 0) \quad (3)$$

$$12 < f_T/f_3 < 15 \quad (4)$$

wherein $LD_{23W}$ designates the distance from the most object-side surface of the negative second lens group to the most image-side surface of the positive third lens group, at the short focal length extremity;

$\Delta D_{23}$ designates the difference in the distance between the negative second lens group and the positive third lens group at the short focal length extremity and the distance therebetween at the long focal length extremity;

$f_2$ designates the focal length of the negative second lens group;

$f_3$ designates the focal length of the positive third lens group;

$f_W$ designates the focal length of the entire the zoom lens system at the short focal length extremity; and $f_T$ designates the focal length of the entire the zoom lens system at the long focal length extremity.

The high zoom-ratio zoom lens system preferably satisfies the following condition:

$$1.4 < f_{23T}/f_{23W} < 1.7 \quad (5)$$

wherein $f_{23T}$ designates the combined focal length of the negative second lens group and the positive third lens group at the long focal length extremity; and $f_{23W}$ designates the combined focal length of the negative second lens group and the positive third lens group at the short focal length extremity.

The high zoom-ratio zoom lens system preferably satisfies the following condition:

$$0.05 < |ra/f_T| < 0.15 \ (ra<0) \quad (6)$$

wherein ra designates the radius of curvature of the most object-side surface of the negative second lens group; and $f_T$ designates the focal length of the entire the zoom lens system at the long focal length extremity.

The positive third lens group includes at least two positive lens elements, and preferably satisfies the following conditions:

$$np < 1.55 \quad (7)$$

$$vp > 65 \quad (8)$$

wherein np designates the average refractive index, with respect to the d-line, of the positive lens elements in the positive third lens group; and vp designates the average Abbe number, with respect to the d-line, of the positive lens elements in the positive third lens group.

Focusing is preferably carried out by integrally moving the negative second lens group and the positive third lens group.

The present disclosure relates to subject matter contained in Japanese Patent Application No. 2002-238868 (filed on Aug. 20, 2002) which is expressly incorporated herein in its entirety.

BRIEF DESCRIPTION OF THE DRAWINGS

The present invention will be discussed below in detail with reference to the accompanying drawings, in which:

FIGS. 3A, 3B, 3C and 3D show aberrations occurred in the lens arrangement shown in FIG. 1 at a first intermediate focal length (before switching: short focal length side);

FIGS. 4A, 4B, 4C and 4D show aberrations occurred in the lens arrangement shown in FIG. 1 at a second intermediate focal length (after switching: long focal length side);

FIGS. 5A, 5B, 5C and 5D show aberrations occurred in the lens arrangement shown in FIG. 1 at the long focal length extremity;

FIG. 6 is a lens arrangement, at the short focal length extremity, of the high zoom-ratio zoom lens system according to a second embodiment of the present invention;

FIGS. 7A, 7B, 7C and 7D show aberrations occurred in the lens arrangement shown in FIG. 6;

FIGS. 8A, 8B, 8C and 8D show aberrations occurred in the lens arrangement shown in FIG. 6 at a first intermediate focal length (before switching: short focal length side);

FIGS. 9A, 9B, 9C and 9D show aberrations occurred in the lens arrangement shown in FIG. 6 at a second intermediate focal length (after switching: long focal length side);

FIGS. 10A, 10B, 10C and 10D show aberrations occurred in the lens arrangement shown in FIG. 6 at the long focal length extremity;

FIGS. 19A, 19B, 19C and 19D show aberrations occurred in the lens arrangement shown in FIG. 16 at a second intermediate focal length (after switching: long focal length side);

FIGS. 20A, 20B, 20C and 20D show aberrations occurred in the lens arrangement shown in FIG. 16 at the long focal length extremity;

FIG. 21 is a lens arrangement, at the short focal length extremity, of the high zoom-ratio zoom lens system according to a fifth embodiment of the present invention;

FIGS. 22A, 22B, 22C and 22D show aberrations occurred in the lens arrangement shown in FIG. 21;

FIGS. 25A, 25B, 25C and 25D show aberrations occurred in the lens arrangement shown in FIG. 21 at the long focal length extremity;

FIG. 26 is a schematic view of the lens-group moving paths for the high zoom-ratio zoom lens system according to the first to fifth embodiments of the present invention; and FIG. 27 is a schematic view of the lens-group moving paths, for the high zoom-ratio zoom lens system, without intermediate-switching focal lengths.

DESCRIPTION OF THE PREFERRED EMBODIMENTS

Figure 1:
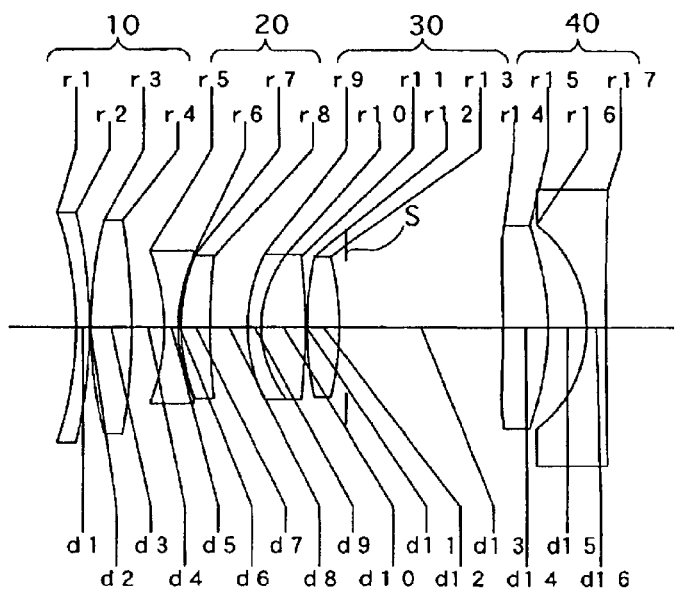
FIG. 1 is a lens arrangement, at the short focal length extremity, of the high zoom-ratio zoom lens system according to a first embodiment of the present invention.
Figure 2A:
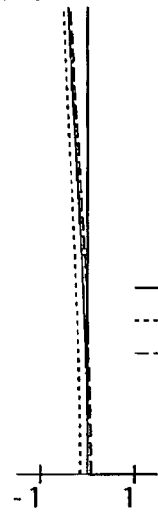
FIGS. 2A, 2B, 2C and 2D show aberrations occurred in the lens arrangement shown in FIG. 1.
Figure 2B:
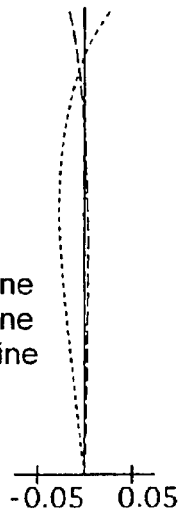
Figure 2C:
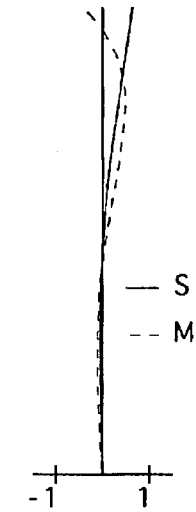
Figure 2D:
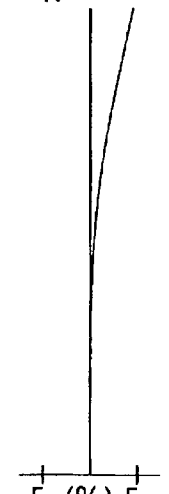

As shown in the lens-group moving paths of FIGS. 26 and 27, the zoom lens system for a compact camera includes a four-lens-group arrangement, i.e., a positive first lens group 10, a negative second lens group 20, a positive third lens group 30, and a negative fourth lens group 40, in this order from the object; and zooming is performed by moving all of the positive first through positive fourth lens groups in the optical axis direction. A diaphragm S is provided between the positive third lens group 30 and the negative fourth lens group 40, and moves together with the positive third lens group 30 upon zooming.

FIG. 26 is an example of the lens-group moving paths having a switching movement of the lens groups at the intermediate focal lengths. According to FIG. 26, zooming from the short focal length extremity fw toward the long focal length extremity ft, the lens groups 10 through 40 are arranged to move as follows:

In a focal-length range ZW (the first focal length range; the short-focal-length side zooming range) from the short focal length extremity fw to the first intermediate focal length fm, the positive first lens group 10, the negative second lens group 20, the positive third lens group 30, and the negative fourth lens group 40 are moved toward the object.

At the first intermediate focal length fm (before switching), the positive first lens group 10, the negative second lens group 20, the positive third lens group 30, and the negative fourth lens group 40 are moved towards the image plane by a predetermined distance, so that the first intermediate focal length fm is changed to the second intermediate focal length fm' (after switching).

In a focal-length range ZT (the second focal length range; the long-focal-length side zooming range) from the second intermediate focal length fm' to the long focal length extremity ft, the positive first lens group 10, the negative second lens group 20, the positive third lens group 30, and the negative fourth lens group 40 are moved towards the object.

In the focal-length range ZW, the negative second lens group 20 and the positive third lens group 30 maintains a predetermined distance d1 (the first state).

At the first intermediate focal length fm, the distance d1 between the negative second lens group 20 and the positive third lens group 30 is reduced to a distance d2 (the second state).

In the focal-length range ZT, the negative second lens group 20 and the positive third lens group 30 maintain the reduced distance d2 (the second state).

The first intermediate focal length fm belongs to the first focal length range ZW.

The second intermediate focal length fm' is determined after the following movement of the lens groups is completed:

(i) the positive first lens group 10 and the negative fourth lens group 40 are moved from the positions thereof, corresponding to the first intermediate focal length fm, toward the image; and (ii) the negative second lens group 20 and the positive third lens group 30 reduce the distance therebetween, while the negative second lens group 20 and the positive third lens group 30 are respectively moved toward the image.

The lens-group-moving paths, before and after the switching movement, for the positive first through positive fourth lens groups shown in FIG. 26 are simply depicted as straight lines. It should however be noted that actual lens-group-moving paths are not necessarily straight lines. Furthermore, focusing is performed by integrally moving the negative second lens group 20 and the positive third lens group 30 regardless of the focal length ranges.

The lens-group-moving paths have discontinuities at the first intermediate focal length fm and the second intermediate focal length fm'; however, by adequately determining the positions of the positive first lens group 10, the negative second lens group 20, the positive third lens group 30, and the negative fourth lens group 40 respectively at the short focal length extremity fw, the first intermediate focal length fm, the second intermediate focal length fm' and the long focal length extremity ft, solutions by which an image is correctly formed on a predetermined image plane can be obtained. According to the lens-group-moving paths with these solutions, a zoom lens system which is miniaturized and has a high zoom ratio can be obtained.

Furthermore, as an alternative, positions for stopping each lens group can be determined in a stepwise manner along the lens-group-moving paths of FIG. 26. For example, if positions at which each lens group is to be stopped are determined by appropriately selecting positions before and after the first (second) intermediate focal length fm (fm'), i.e., not at the positions just corresponding to the first (second) intermediate focal length fm (fm'), the above discontinuities can be connected by smooth curved lines. Moreover, if a stopping position closest to the second intermediate focal length fm' in the second focal length range ZT is set closer to the object side than to a stopping position closest to the first intermediate focal length fm in the first focal length range ZW, precision on the movement of the lens groups can be enhanced, since a U-turn movement is prevented in actual moving paths.

FIG. 27 shows an example of the lens-group moving paths without intermediate-switching focal lengths. Upon zooming from the short focal length extremity toward the long focal length extremity, all the lens groups move toward the object, while the distances therebetween are varied. The diaphragm S is provided between the positive third lens group 30 and the negative fourth lens group 40, and moves together with the positive third lens group 30. The lens-group-moving paths of FIG. 27 are simply depicted as straight lines; however actual lens-group-moving paths are not necessarily straight lines. Furthermore, focusing is performed by integrally moving the negative second lens group 20 and the positive third lens group 30 regardless of the focal length ranges.

Condition (1) specifies the distance from the most object-side surface of the negative second lens group 20 to the most image-side surface of the positive third lens group 30, at the short focal length extremity.

If the above distance between the negative second lens group 20 and the positive third lens group 30 becomes shorter to the extent that $LD_{23W}/f_W$ exceeds the lower limit of condition (1), the back focal distance at the short focal length extremity becomes extremely short. Consequently, the diameter of the rearmost lens group (the negative fourth lens group 40) becomes larger.

If $LD_{23W}/f_W$ exceeds the upper limit of condition (1), the position of the exit pupil becomes distant at the short focal length extremity where an angle-of-view is wider, the diameter of the frontmost lens group (the positive first lens group 10) becomes larger, so that miniaturization of the zoom lens system in the radial direction becomes difficult.

Condition (2) specifies the change in distance between the negative second lens group 20 and the positive third lens group 30 upon zooming.

If $\Delta D_{23}/f_W$ exceeds the lower limit of condition (2), the zooming effect of the negative second lens group 20 and the positive third lens group 30 is decreased, so that a high zoom ratio becomes difficult to achieve. In this case, if a further attempt is made to obtain a higher zoom ratio, the traveling distance of each lens group becomes longer, so that the overall length of the zoom lens system undesirably becomes longer.

If $\Delta D_{23}/f_W$ exceeds the upper limit of condition (2), the distance between the negative second lens group 20 and the positive third lens group 30 increases; thereby, the distance between the positive first lens group 10 to the positive third lens group 30 becomes longer. Consequently, the diameters of the positive first lens group 10 and the negative second lens group 20 become larger.

Condition (3) specifies the optical power (hereinafter, power) of the negative second lens group 20 with respect to the focal length of the entire the zoom lens system at the long focal length extremity.

If the power of the negative second lens group 20 becomes weaker to the extent that $|f_T/f_2|$ exceeds the lower limit of condition (3), further miniaturization becomes difficult. This is because if an attempt is made to obtain a desired zoom ratio in the case where $|f_T/f_2|$ exceeds the lower limit of condition (3), the difference between the traveling distance of the negative second lens group 20 upon zooming and that of the positive third lens group 30 upon zooming has to be made larger.

If the power of the negative second lens group 20 becomes stronger to the extent that $|f_T/f_2|$ exceeds the upper limit of condition (3), the traveling distance of the negative second lens group 20 can be made shorter; however, the correcting of off-axis aberrations becomes difficult.

In order to achieve a higher zoom ratio with a shorter traveling distance, it is necessary for the negative second lens group 20 to have a strong power. On the other hand, if the power thereof is too strong, coma and off-axis aberrations become larger. Accordingly, in order to reduce occurrence of such off-axis aberrations, the refractive index of a negative lens element of the negative second lens group 20 preferably satisfies the following condition:

N2G>1.75 wherein

N2G designates the refractive index with respect to the d-line of the negative lens element in the negative second lens group 20.

If N2G exceeds the lower limit of this condition, the negative value of the Petzval sum increases, so that the off-axis optical-performance deteriorates.

Condition (4) specifies the power of the positive third lens group 30 with respect to the focal length of the entire the zoom lens system at the long focal length extremity.

If the power of the positive third lens group 30 becomes weaker to the extent that $f_T/f_3$ exceeds the lower limit of condition (4), the traveling distance of the positive third lens group 30 becomes longer upon zooming, so that it becomes difficult to achieve a higher zoom ratio.

If the power of the positive third lens group 30 becomes stronger to the extent that $f_T/f_3$ exceeds the upper limit of condition (4), the traveling distance of the positive third lens group 30 can be made shorter; however, fluctuation in spherical aberration from the short focal length extremity to the long focal length extremity cannot be adequately reduced.

Condition (5) specifies the ratio of the combined focal length of the negative second lens group 20 and the positive third lens group 30 at the long focal length extremity to the combined focal length thereof at the short focal length extremity.

If $f_{23T}/f_{23W}$ exceeds the lower limit of condition (5), the effect of the negative second lens group 20 and the positive third lens group 30 as movable lens groups is greatly reduced. Consequently, it becomes difficult to achieve a wider angle-of-view (a shorter focal length at the short focal length extremity) and a higher zoom ratio.

If $f_{23T}/f_{23W}$ exceeds the upper limit of condition (5), the difference between the traveling distance of the negative second lens group 20 upon zooming and that of the positive third lens group 30 upon zooming becomes larger. Consequently, the diameter of the frontmost lens group becomes larger at the short focal length extremity, and further miniaturization cannot be achieved.

Condition (6) specifies the radius of curvature of the most object-side surface of the negative second lens group 20.

If the radius of curvature becomes smaller to the extent hat $|ra/f_T|$ exceeds the lower limit of condition (6), the height of light rays incident on the positive first lens group 10 becomes higher, and the correcting of off-axis aberrations becomes difficult.

If the radius of curvature becomes larger to the extent that $|ra/f_T|$ exceeds the upper limit of condition (6), the height of light rays incident on the positive first lens group 10 becomes lower; however, a wider angle-of-view cannot be achieved.

Furthermore, in order to improve the off-axis optical performance, the most object-side surface of the negative second lens group 20 is preferably formed as an aspherical surface on which the curvature widens toward the periphery thereof, compared with the paraxial spherical surface.

Condition (7) specifies the average refractive index of two positive lens elements of the positive third lens group 30 in the case where positive power is distributed over the two positive lens elements therein. In order to achieve both a higher zoom ratio and further miniaturization, it is necessary to increase the power of each lens group, especially the positive third lens group 30. The positive third lens group 30 can reduce occurrences of aberrations by distributing the optical power over the two positive lens elements. Furthermore, by decreasing the average refractive index of the two positive lens elements, the negative Petzval sum which tends to be larger in a miniaturized zoom lens system can be made smaller.

If np exceeds the upper limit of condition (7), the Petzval sum becomes larger, and it becomes difficult to reduce field curvature and astigmatism.

Condition (8) specifies the Abbe number of the above-mentioned two positive lens elements of the positive third lens group 30.

If the Abbe number becomes smaller to the extent that vp exceeds the lower limit of condition (8), it becomes difficult to reduce fluctuations of chromatic aberration upon zooming.

According to the high zoom-ratio zoom lens system described above, focusing is performed by integrally moving the negative second lens group 20 and the positive third lens group 30 regardless of the focal length ranges. In order to further miniaturize the camera, the focusing lens group is preferably a small and light-weight lens group, and has a shorter traveling distance. For satisfying the above requirements, the negative second lens group 20 or the positive third lens group 30 can be used as a focusing lens group. This is because the optical effective diameter of these lens groups is relatively smaller compared with that of other lens groups. On the other hand, if only the negative second lens group 20 or only the positive third lens group 30 is used to carry out focusing, the traveling distance thereof becomes longer, so that further miniaturization becomes difficult. Namely, by performing focusing by integrally moving the negative second lens group 20 and the positive third lens group 30, further miniaturization can be achieved, and deterioration of optical performance in photographing an object at a closer distances can be greatly reduced.

Specific numerical embodiments will be herein discussed. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. In the diagrams of astigmatism, S designates the sagittal image, and M designates the meridional image. In the tables, FNO designates the f-number, f designates the focal length of the entire zoom lens system, W designates the half angle-of-view (°), fB designates the back focal distance, r designates the radius of curvature, d designates the lens-element thickness or distance between lens elements, Nd designates the refractive index of the d-line, and vd designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

Embodiment 1

FIG. 1 is a lens arrangement, at the short focal length extremity, of the high zoom-ratio zoom lens system according to the first embodiment of the present invention. FIGS. 2A through 2D show aberrations occurred in the lens arrangement shown in FIG. 1. FIGS. 3A through 3D show aberrations occurred in the lens arrangement shown in FIG. 1 at a first intermediate focal length (before switching: short focal length side). FIGS. 4A through 4D show aberrations occurred in the lens arrangement shown in FIG. 1 at a second intermediate focal length (after switching: long focal length side). FIGS. 5A through 5D show aberrations occurred in the lens arrangement shown in FIG. 1 at the long focal length extremity. Table 1 shows the numerical data of the first embodiment.

The lens surface Nos. 1 through 4 constitute the positive first lens group 10; the lens surface Nos. 5 through 8 constitute the negative second lens group 20; the lens surface Nos. 9 through 13 constitute the positive third lens group 30; and the lens surface Nos. 14 through 17 constitute the negative fourth lens group 40. The diaphragm S is provided 0.50 behind (on the image side of) the positive third lens group 30 (lens surface No. 13).

The positive first lens group 10 includes a positive meniscus lens element having the concave surface facing toward the object, and a positive lens element, in this order from the object.

The negative second lens group 20 includes a negative biconcave lens element and a positive lens element, in this order from the object.

The positive third lens group 30 includes a cemented lens elements having a negative meniscus lens having the convex surface facing toward the object and a positive lens element, and another positive lens element, in this order from the object.

The negative fourth lens group 40 includes a positive lens element and a negative lens element, in this order from the object.

Note that the first through fifth embodiments are all applied to the zoom lens system having the lens-group moving paths of FIG. 26; however, the lens-group moving paths are determined stepwise so as not to pass through the first intermediate focal length fm of the short-focal-length side zooming range ZW and the second intermediate focal length fm' of the long-focal-length side zooming range ZT.

TABLE 1

FNO. = 1:5.6–11.3–9.4–13.5
f = 28.50–69.91–114.09–170.11
W = 36.0–17.4–10.5–7.2
fB = 8.20–46.79–52.66–86.45

| Surf. No. | r | d | Nd | νd |
|---|---|---|---|---|
| 1 | −26.203 | 1.00 | 1.84666 | 23.8 |
| 2 | −36.484 | 0.10 | — | — |
| 3 | 31.990 | 3.00 | 1.48749 | 70.2 |
| 4 | −49.626 | 2.40–4.32–16.36–17.45 | — | — |
| 5* | −14.212 | 1.00 | 1.77250 | 49.6 |
| 6 | 12.523 | 0.21 | — | — |
| 7 | 13.781 | 2.16 | 1.84666 | 23.8 |
| 8 | 48.506 | 2.80–2.80–0.20–0.20 | — | — |
| 9 | 12.033 | 1.00 | 1.84666 | 23.8 |
| 10 | 8.500 | 3.28 | 1.48749 | 70.2 |

TABLE 1-continued

| | | | | |
|---|---|---|---|---|
| 11* | −35.964 | 0.10 | — | — |
| 12 | 24.204 | 2.40 | 1.48749 | 70.2 |
| 13 | −21.850 | 12.24–3.62–4.07–1.99 | — | — |
| 14* | −104.120 | 3.38 | 1.58547 | 29.9 |
| 15* | −19.669 | 2.88 | — | — |
| 16 | −9.498 | 1.40 | 1.72916 | 54.7 |
| 17 | 347.877 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | 0.00 | $0.77348 \times 10^{-4}$ | $0.39897 \times 10^{-6}$ | $-0.36166 \times 10^{-8}$ |
| 11 | 0.00 | $0.10069 \times 10^{-3}$ | $0.92198 \times 10^{-6}$ | $-0.11116 \times 10^{-7}$ |
| 14 | 0.00 | $-0.11027 \times 10^{-4}$ | $0.21498 \times 10^{-5}$ | $0.29380 \times 10^{-8}$ |
| 15 | 0.00 | $-0.79575 \times 10^{-4}$ | $0.17994 \times 10^{-5}$ | $0.42939 \times 10^{-8}$ |

Embodiment 2

FIG. 6 is a lens arrangement, at the short focal length extremity, of the high zoom-ratio zoom lens system according to the second embodiment of the present invention.

FIGS. 7A through 7D show aberrations occurred in the lens arrangement shown in FIG. 6. FIGS. 8A through 8D show aberrations occurred in the lens arrangement shown in FIG. 6 at a first intermediate focal length (before switching: short focal length side) FIGS. 9A through 9D show aberrations occurred in the lens arrangement shown in FIG. 6 at a second intermediate focal length (after switching: long focal length side). FIGS. 10A through 10D show aberrations occurred in the lens arrangement shown in FIG. 6 at the long focal length extremity. Table 2 shows the numerical data of the second embodiment. The basic lens arrangement of the second embodiment is the same as the first embodiment. The diaphragm S is provided 0.50 behind (on the image side of) the positive third lens group 30 (lens surface No. 13).

TABLE 2

FNO. = 1:5.5–11.5–9.2–12.7
f = 28.50–70.55–108.02–170.09
W = 35.9–17.2–11.0–7.2
fB = 8.29–48.48–48.57–87.09

| Surf. No. | r | d | Nd | νd |
|---|---|---|---|---|
| 1 | −26.583 | 1.00 | 1.84666 | 23.8 |
| 2 | −35.184 | 0.10 | — | — |
| 3 | 31.862 | 3.00 | 1.48749 | 70.2 |
| 4 | −55.024 | 2.40–3.68–16.96–17.45 | — | — |
| 5* | −13.830 | 0.80 | 1.80400 | 46.6 |
| 6 | 12.934 | 0.18 | — | — |
| 7 | 14.339 | 2.04 | 1.84666 | 23.8 |
| 8 | 73.745 | 2.80–2.80–0.20–0.20 | — | — |
| 9 | 12.207 | 1.00 | 1.84666 | 23.8 |
| 10 | 8.628 | 3.30 | 1.48749 | 70.2 |
| 11* | −32.512 | 0.11 | — | — |
| 12 | 25.232 | 2.44 | 1.48749 | 70.2 |
| 13 | −21.877 | 12.27–3.57–4.04–1.74 | — | — |
| 14* | −68.065 | 3.20 | 1.68893 | 31.1 |
| 15* | −19.511 | 2.93 | — | — |
| 16 | −9.342 | 1.40 | 1.72916 | 54.7 |
| 17 | 423.563 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | 0.00 | $0.87485 \times 10^{-4}$ | $0.29190 \times 10^{-6}$ | $-0.18991 \times 10^{-8}$ |
| 11 | 0.00 | $0.10287 \times 10^{-3}$ | $0.84197 \times 10^{-6}$ | $-0.74276 \times 10^{-8}$ |
| 14 | 0.00 | $-0.21544 \times 10^{-4}$ | $0.22193 \times 10^{-5}$ | $0.38060 \times 10^{-8}$ |
| 15 | 0.00 | $-0.77313 \times 10^{-4}$ | $0.15898 \times 10^{-5}$ | $0.58433 \times 10^{-8}$ |

Embodiment 3

Figure 11:
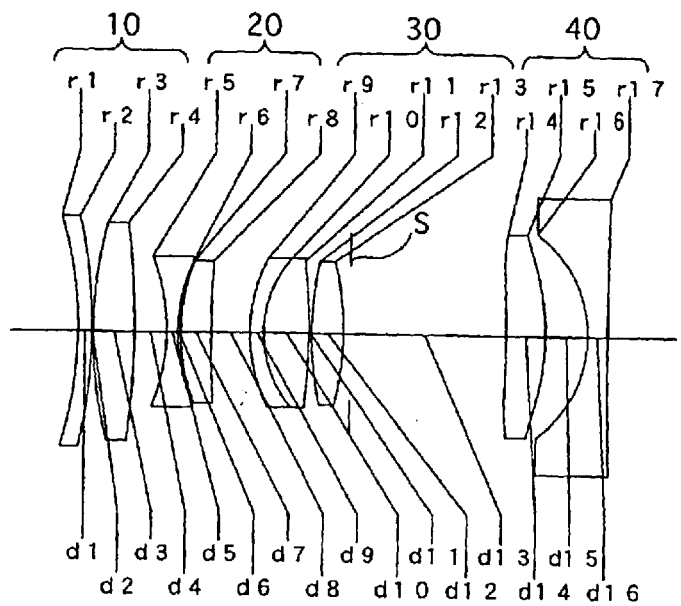
FIG. 11 is a lens arrangement, at the short focal length extremity, of the high zoom-ratio zoom lens system according to a third embodiment of the present invention.
Figures 12A, 12B, 12C, 12D:
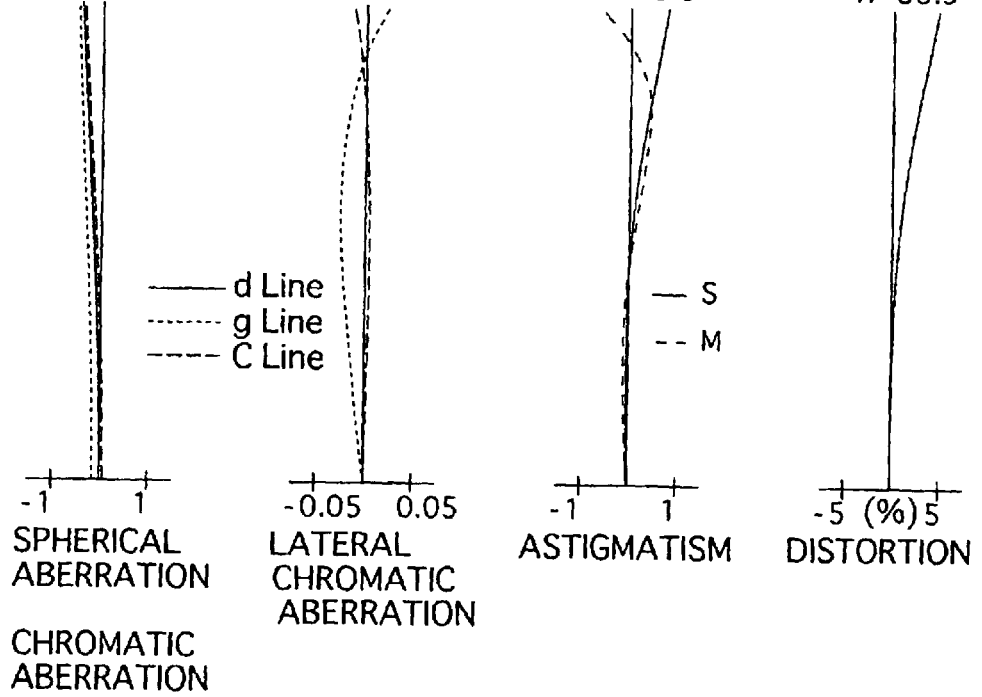
FIGS. 12A, 12B, 12C and 12D show aberrations occurred in the lens arrangement shown in FIG. 11.
Figure 13A:
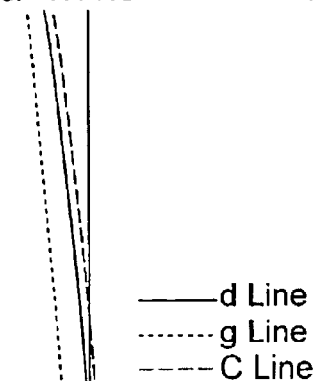
FIGS. 13A, 13B, 13C and 13D show aberrations occurred in the lens arrangement shown in FIG. 11 at a first intermediate focal length (before switching: short focal length side)
Figure 13B:
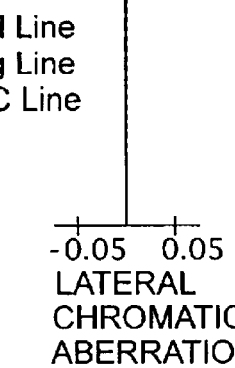
Figure 13C:
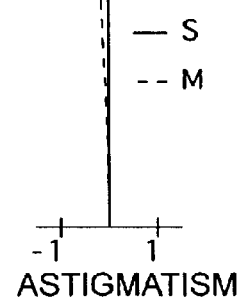
Figure 13D:
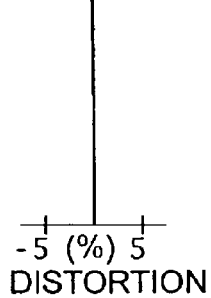
Figure 14A:
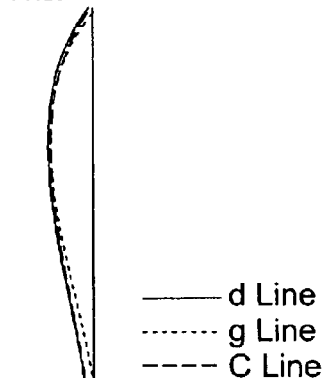
FIGS. 14A, 14B, 14C and 14D show aberrations occurred in the lens arrangement shown in FIG. 11 at a second intermediate focal length (after switching: long focal length side)
Figure 14B:
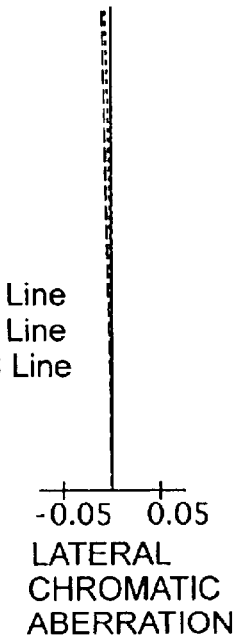
Figure 14C:
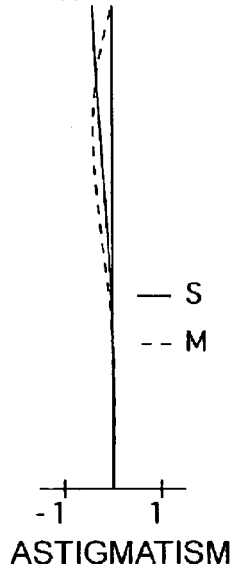
Figure 14D:
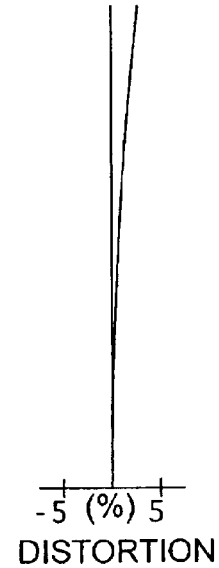
Figure 15A:
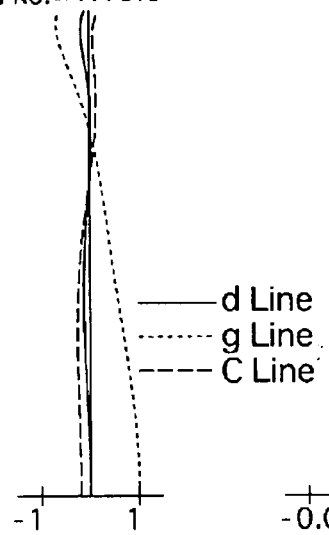
FIGS. 15A, 15B, 15C and 15D show aberrations occurred in the lens arrangement shown in FIG. 11 at the long focal length extremity.
Figure 15B:
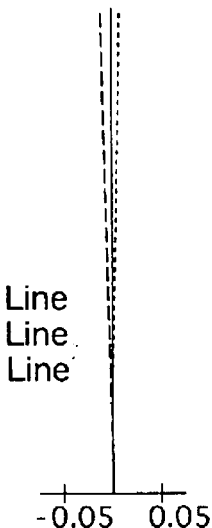
Figure 15C:
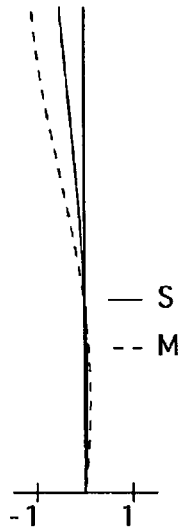
Figure 15D:
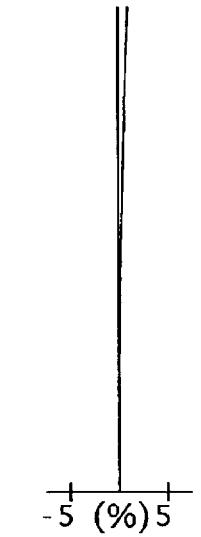

FIG. 11 is a lens arrangement, at the short focal length extremity, of the high zoom-ratio zoom lens system according to the third embodiment of the present invention. FIGS. 12A through 12D show aberrations occurred in the lens arrangement shown in FIG. 11. FIGS. 13A through 13D how aberrations occurred in the lens arrangement shown in FIG. 11 at a first intermediate focal length (before switching: short focal length side). FIGS. 14A through 14D show aberrations occurred in the lens arrangement shown in FIG. 11 at a second intermediate focal length (after switching: long focal length side). FIGS. 15A through 15D show aberrations occurred in the lens arrangement shown in FIG. 11 at the long focal length extremity. Table 3 shows the numerical data of the third embodiment. The basic lens arrangement of the third embodiment is the same as the first embodiment. The diaphragm S is provided 0.50 behind (on the image side of) the positive third lens group 30 (lens surface No. 13).

TABLE 3

FNO. = 1:5.5–11.6–9.6–13.5
f = 28.50–71.21–110.81–170.00
W = 35.9–17.1–10.8–7.2
fB = 8.41–48.33–50.32–7.16

| Surf. No. | r | d | Nd | νd |
|---|---|---|---|---|
| 1 | −28.699 | 1.00 | 1.84666 | 23.8 |
| 2 | −38.452 | 0.10 | — | — |
| 3 | 32.456 | 3.00 | 1.49700 | 81.6 |
| 4 | −61.269 | 2.40–3.89–17.26–7.45 | — | — |
| 5* | −13.527 | 0.80 | 1.77250 | 49.6 |
| 6 | 12.377 | 0.21 | — | — |
| 7 | 13.830 | 2.26 | 1.80518 | 25.4 |
| 8 | 84.388 | 2.80–2.80–0.20–0.20 | — | — |
| 9 | 12.136 | 1.00 | 1.84666 | 23.8 |
| 10 | 8.529 | 3.26 | 1.48749 | 70.2 |
| 11* | −34.534 | 0.20 | — | — |
| 12 | 26.013 | 2.29 | 1.48749 | 70.2 |
| 13 | −21.466 | 11.88–3.40–3.69–1.70 | — | — |
| 14* | −87.880 | 2.86 | 1.58547 | 29.9 |
| 15* | −19.026 | 3.11 | — | — |
| 16 | −9.305 | 1.40 | 1.72916 | 54.7 |
| 17 | 378.935 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | 0.00 | $0.89824 \times 10^{-4}$ | $0.30461 \times 10^{-6}$ | $-0.19363 \times 10^{-8}$ |
| 11 | 0.00 | $0.99853 \times 10^{-4}$ | $0.83508 \times 10^{-6}$ | $-0.13106 \times 10^{-7}$ |
| 14 | 0.00 | $-0.10310 \times 10^{-4}$ | $0.21777 \times 10^{-5}$ | $0.56448 \times 10^{-8}$ |
| 15 | 0.00 | $-0.77420 \times 10^{-4}$ | $0.17573 \times 10^{-5}$ | $0.61317 \times 10^{-8}$ |

Embodiment 4

Figure 16:
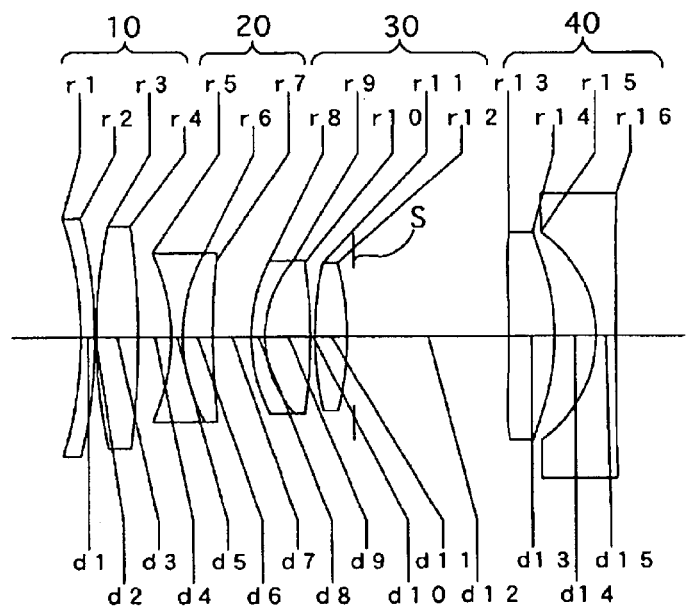
FIG. 16 is a lens arrangement, at the short focal length extremity, of the high zoom-ratio zoom lens system according to a fourth embodiment of the present invention.
Figure 17A:
FIGS. 17A, 17B, 17C and 17D show aberrations occurred in the lens arrangement shown in FIG. 16.
Figure 17B:
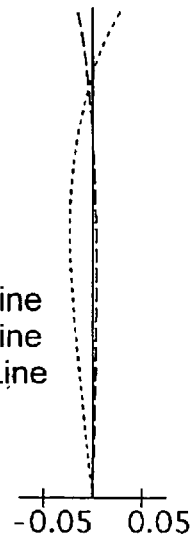
Figure 17C:
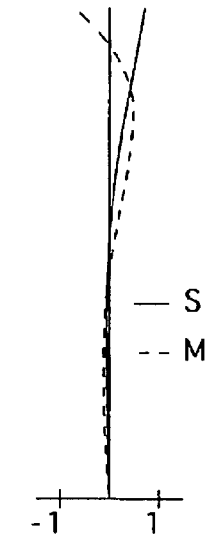
Figure 17D:
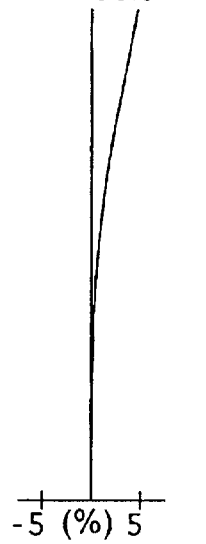
Figure 18A:
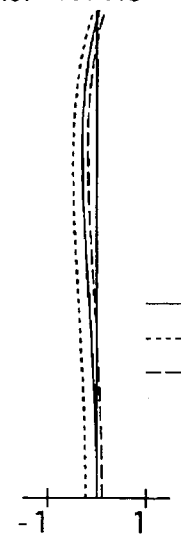
FIGS. 18A, 18B, 18C and 18D show aberrations occurred in the lens arrangement shown in FIG. 16 at a first intermediate focal length (before switching: short focal length side)
Figure 18B:
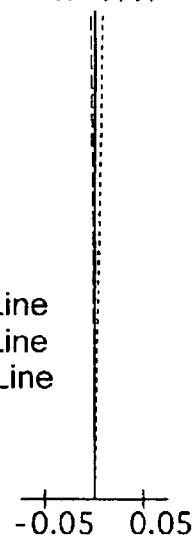
Figure 18C:
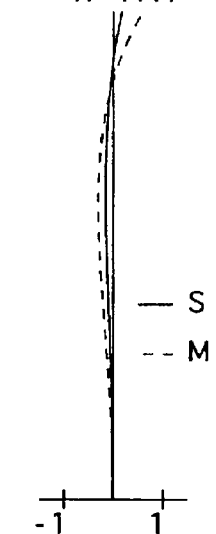
Figure 18D:
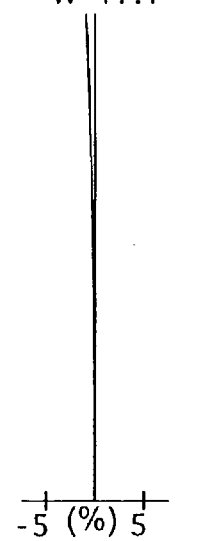
Figure 23A:
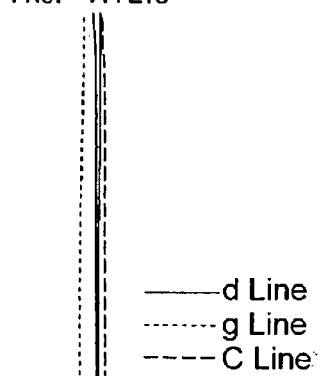
FIGS. 23A, 23B, 23C and 23D show aberrations occurred in the lens arrangement shown in FIG. 21 at a first intermediate focal length (before switching: short focal length side)
Figure 23B:
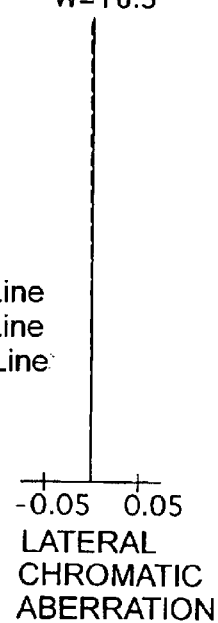
Figure 23C:
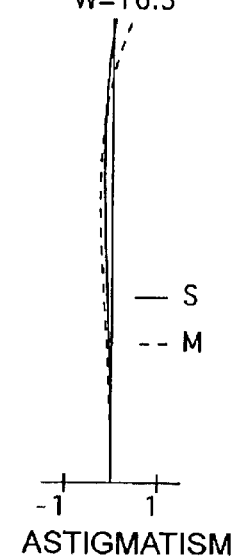
Figure 23D:
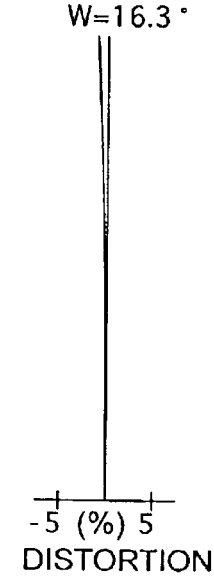
Figure 24A:
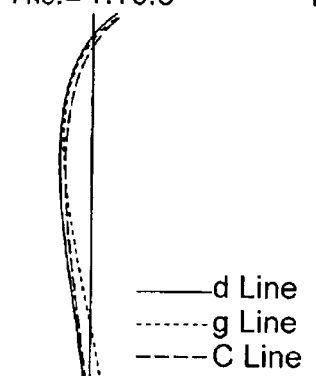
FIGS. 24A, 24B, 24C and 24D show aberrations occurred in the lens arrangement shown in FIG. 21 at a second intermediate focal length (after switching: long focal length side)
Figure 24B:
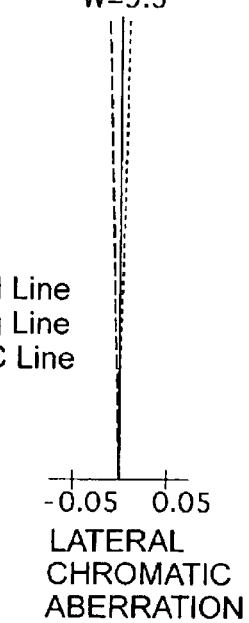
Figure 24C:
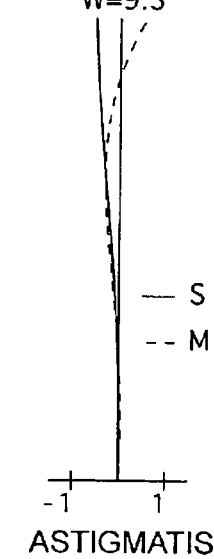
Figure 24D:
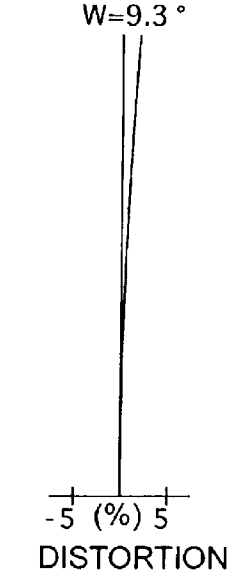

FIG. 16 is a lens arrangement, at the short focal length extremity, of the high zoom-ratio zoom lens system according to the fourth embodiment of the present invention. FIGS. 17A through 17D show aberrations occurred in the lens arrangement shown in FIG. 16. FIGS. 18A through 18D show aberrations occurred in the lens arrangement shown in FIG. 16 at a first intermediate focal length (before switching: short focal length side). FIGS. 19A through 19D show aberrations occurred in the lens arrangement shown in FIG. 16 at a second intermediate focal length (after switching: long focal length side). FIGS. 20A through 20D show aberrations occurred in the lens arrangement shown in FIG. 16 at the long focal length extremity. Table 4 shows the numerical data of the fourth embodiment.

The basic lens arrangement of the fourth embodiment is the same as the first embodiment except that the negative lens element and the positive lens element of the negative second lens group 20 are cemented together. The diaphragm S is provided 0.50 behind (on the image side of) the positive third lens group 30 (lens surface No. 12).

TABLE 4

FNO. = 1:5.5–11.3–9.4–13.2
f = 28.50–71.09–113.02–169.98
W = 35.9–17.1–10.5–7.2
fB = 8.22–47.80–50.29–86.92

| Surf. No. | r | d | Nd | νd |
|---|---|---|---|---|
| 1 | −29.222 | 1.00 | 1.84666 | 23.8 |
| 2 | −36.849 | 0.10 | — | — |
| 3 | 38.017 | 3.00 | 1.49700 | 81.6 |
| 4 | −59.475 | 2.40–4.19–18.43–17.45 | — | — |
| 5* | −13.500 | 0.80 | 1.77250 | 49.6 |
| 6 | 12.518 | 2.18 | 1.80518 | 25.4 |
| 7 | 52.375 | 2.77–2.77–0.20–0.20 | — | — |
| 8 | 12.342 | 1.00 | 1.84666 | 23.8 |
| 9 | 8.540 | 3.28 | 1.48749 | 70.2 |
| 10* | −29.218 | 0.33 | — | — |
| 11 | 25.206 | 2.30 | 1.48749 | 70.2 |
| 12 | −21.633 | 11.73–3.14–3.42–1.73 | — | — |
| 13* | −82.609 | 3.32 | 1.58547 | 29.9 |
| 14* | −18.245 | 2.98 | — | — |
| 15 | −9.186 | 1.40 | 1.72916 | 54.7 |
| 16 | 540.343 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | 0.00 | $0.62834 \times 10^{-4}$ | $0.28181 \times 10^{-6}$ | $0.69519 \times 10^{-9}$ |
| 10 | 0.00 | $0.97406 \times 10^{-4}$ | $0.11065 \times 10^{-5}$ | $-0.80836 \times 10^{-9}$ |

-continued

| Surf. No. | K | A4 | A6 | A8 |
|---|---|---|---|---|
| 13 | 0.00 | $-0.10939 \times 10^{-4}$ | $0.22442 \times 10^{-5}$ | $0.52504 \times 10^{-8}$ |
| 14 | 0.00 | $-0.83039 \times 10^{-4}$ | $0.16000 \times 10^{-5}$ | $0.57422 \times 10^{-8}$ |

Embodiment 5

FIG. 21 is a lens arrangement, at the short focal length extremity, of the high zoom-ratio zoom lens system according to the fifth embodiment of the present invention. FIGS. 22A through 22D show aberrations occurred in the lens arrangement shown in FIG. 21. FIGS. 23A through 23D show aberrations occurred in the lens arrangement shown in FIG. 21 at a first intermediate focal length (before switching: short focal length side). FIGS. 24A through 24D show aberrations occurred in the lens arrangement shown in FIG. 21 at a second intermediate focal length (after switching: long focal length side). FIGS. 25A through 25D show aberrations occurred in the lens arrangement shown in FIG. 21 at the long focal length extremity. Table 5 shows the numerical data of the fifth embodiment. The basic lens arrangement of the fifth embodiment is the same as the first embodiment. The diaphragm S is provided 0.50 behind (on the image side of) the positive third lens group 30 (lens surface No. 13).

TABLE 5

FNO. = 1:5.2–12.0–10.8–13.2
f = 28.59–74.78–129.62–170.11
W = 35.9–16.3–9.3–7.2
fB = 8.29–51.14–62.08–85.85

| Surf. No. | r | d | Nd | νd |
|---|---|---|---|---|
| 1 | −29.250 | 1.00 | 1.84666 | 23.8 |
| 2 | −41.107 | 0.10 | — | — |
| 3 | 32.590 | 3.00 | 1.48749 | 70.2 |
| 4 | −54.106 | 2.40–4.32–16.36–17.45 | — | — |
| 5* | −13.868 | 0.80 | 1.77250 | 49.6 |
| 6 | 12.490 | 0.22 | — | — |
| 7 | 13.822 | 1.99 | 1.84666 | 23.8 |
| 8 | 51.816 | 2.80–2.80–0.20–0.20 | — | — |
| 9 | 12.344 | 1.00 | 1.84666 | 23.8 |
| 10 | 8.500 | 3.23 | 1.48749 | 70.2 |
| 11* | −29.829 | 0.10 | — | — |
| 12 | 23.365 | 3.03 | 1.48749 | 70.2 |
| 13 | −22.363 | 12.24–3.62–4.07–2.72 | — | — |
| 14* | −55.447 | 3.02 | 1.63000 | 0.0 |
| 15* | −17.799 | 2.88 | — | — |
| 16 | −9.653 | 1.40 | 1.81600 | 46.6 |
| 17 | −179.994 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | 0.00 | $0.81289 \times 10^{-4}$ | $0.31065 \times 10^{-6}$ | $-0.11329 \times 10^{-8}$ |
| 11 | 0.00 | $0.90877 \times 10^{-4}$ | $0.73115 \times 10^{-6}$ | $-0.12362 \times 10^{-7}$ |
| 14 | 0.00 | $-0.69743 \times 10^{-5}$ | $0.29208 \times 10^{-5}$ | $-0.35497 \times 10^{-8}$ |
| 15 | 0.00 | $-0.58613 \times 10^{-4}$ | $0.24932 \times 10^{-5}$ | $0.20694 \times 10^{-8}$ |

Table 6 shows the numerical values of each condition for each embodiment.

TABLE 6

| | Embod. 1 | Embod. 2 | Embod. 3 | Embod. 4 | Embod. 5 |
|---|---|---|---|---|---|
| Cond. (1) | 0.444 | 0.445 | 0.472 | 0.444 | 0.461 |
| Cond. (2) | 0.091 | 0.091 | 0.091 | 0.090 | 0.091 |
| Cond. (3) | 12.349 | 12.387 | 12.018 | 12.125 | 12.389 |
| Cond. (4) | 13.197 | 13.217 | 13.047 | 13.288 | 13.307 |
| Cond. (5) | 1.529 | 1.533 | 1.486 | 1.505 | 1.516 |
| Cond. (6) | 0.084 | 0.081 | 0.080 | 0.079 | 0.082 |
| Cond. (7) | 1.487 | 1.487 | 1.487 | 1.487 | 1.487 |
| Cond. (8) | 70.2 | 70.2 | 70.2 | 70.2 | 70.2 |

As can be understood from Table 6, the numerical values of the first through fifth embodiments satisfy conditions (1) through (8), and as can be understood from the drawings, the various aberrations at each focal length have been adequately corrected.

According to the above description, a miniaturized and high-zoom-ratio zoom lens system, in which (i) the overall length thereof can be made shorter at the long focal length extremity, (ii) the diameter of the frontmost lens group can be reduced, and (iii) appropriate optical performance is attained over the entire focal length regard less of a smaller number of lens elements, can be achieved.

What is claimed is:

1. A high-zoom-ratio zoom lens system comprising a positive first lens group, a negative second lens group, a positive third lens group, and a negative fourth lens group, in this order from an object, wherein zooming is performed by moving each of said positive first through positive fourth lens groups along the optical axis; and wherein said high-zoom-ratio zoom lens system satisfies the following conditions:

$$0.2 < LD_{23W}/f_W < 0.70$$

$$0.02 < \Delta D_{23}/f_W < 0.2$$

$$11 < |f_T/f_2| < 14 \; (f_2 < 0)$$

$$12 < f_T/f_3 < 15$$

wherein $LD_{23W}$ designates the distance from the most object-side surface of said negative second lens group to the most image-side surface of said positive third lens group, at the short focal length extremity;

$\Delta D_{23}$ designates the difference in the distance between said negative second lens group and said positive third lens group at the short focal length extremity and the distance between said negative second lens group and said positive third lens group at the long focal length extremity;

$f_2$ designates the focal length of said negative second lens group;

$f_3$ designates the focal length of said positive third lens group;

$f_W$ designates the focal length of the entire the zoom lens system at the short focal length extremity; and $f_T$ designates the focal length of the entire the zoom lens system at the long focal length extremity.

2. The high-zoom-ratio zoom lens system according to claim 1, satisfying the following condition:

$$1.4 < f_{23T}/f_{23W} < 1.7$$

wherein $f_{23T}$ designates the combined focal length of said negative second lens group and said positive third lens group at the long focal length extremity; and $f_{23W}$ designates the combined focal length of said negative second lens group and said positive third lens group at the short focal length extremity.

3. The high-zoom-ratio zoom lens system according to claim 1, satisfying the following condition:

$$0.05 < |ra/f_T| < 0.15 \ (ra < 0)$$

wherein ra designates the radius of curvature of the most object-side surface of said negative second lens group; and $f_T$ designates the focal length of the entire the zoom lens system at the long focal length extremity.

4. The high-zoom-ratio zoom lens system according to claim 1, wherein said positive third lens group comprises at least two positive lens elements, and satisfies the following conditions:

$$np < 1.55$$

$$vp > 65$$

wherein np designates the average refractive index, with respect to the d-line, of said positive lens elements in said positive third lens group; and vp designates the average Abbe number, with respect to the d-line, of said positive lens elements in said positive third lens group.

5. The high-zoom-ratio zoom lens system according to claim 1, wherein focusing is performed by integrally moving said negative second lens group and said positive third lens group.

* * * * *